United States Patent
Hung et al.

(10) Patent No.: US 8,674,673 B2
(45) Date of Patent: Mar. 18, 2014

(54) SWITCHING POWER CONVERTER

(75) Inventors: Shih-Chieh Hung, Xinbei (TW);
Hua-Chiang Huang, Taoyuan County (TW); Jiun-Chiang Chen, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 334 days.

(21) Appl. No.: 13/022,571

(22) Filed: Feb. 7, 2011

(65) Prior Publication Data
US 2012/0126775 A1 May 24, 2012

(30) Foreign Application Priority Data
Nov. 24, 2010 (TW) .................................. 99140584

(51) Int. Cl.
*G05F 1/00* (2006.01)
(52) U.S. Cl.
USPC ........................................ 323/283; 323/284
(58) Field of Classification Search
USPC ................... 323/222, 271, 282, 283, 284, 285
See application file for complete search history.

(56) References Cited

U.S. PATENT DOCUMENTS

| | | | |
|---|---|---|---|
| 6,433,525 B2 | 8/2002 | Muratov et al. | |
| 2005/0258808 A1* | 11/2005 | Chen et al. | 323/222 |
| 2007/0080671 A1* | 4/2007 | Qahouq et al. | 323/282 |
| 2009/0115389 A1* | 5/2009 | Chu et al. | 323/282 |
| 2011/0148379 A1* | 6/2011 | Gu et al. | 323/284 |

* cited by examiner

*Primary Examiner* — Nguyen Tran
(74) *Attorney, Agent, or Firm* — Jianq Chyun IP Office

(57) ABSTRACT

A switching power converter including an upper-bridge switch, a lower-bridge switch, an impedance circuit, a first control circuit, a second control circuit and a logic circuit is provided. The impedance circuit generates an output voltage and a sensing current according to a conductive state of the upper-bridge switch and the lower-bridge switch. The first control circuit generates a first pulse signal according to the output voltage. The second control circuit has a first mode and a second mode for generating a second pulse signal and a third pulse signal individually. Furthermore, the second control circuit uses different threshold values in different modes to determine whether to switch the mode thereof, so as to form a hysteretic effect in mode switching. The logic circuit controls the upper-bridge switch by the first pulse signal, and controls the lower-bridge switch by the second pulse signal or the third pulse signal.

9 Claims, 2 Drawing Sheets

SWITCHING POWER CONVERTER

CROSS-REFERENCE TO RELATED APPLICATION

This application claims the priority benefit of Taiwan application serial no. 99140584, filed on Nov. 24, 2010. The entirety of the above-mentioned patent application is hereby incorporated by reference herein and made a part of this specification.

BACKGROUND OF THE INVENTION

1. Field of the Invention

The present invention generally relates to a power converter, and in particular, to a switching power converter.

2. Description of Related Art

A switching power converter is applicable in a buck power regulator, and generally includes a DC/DC controller, an upper-bridge switch, a lower-bridge switch, and an impedance circuit composed of elements such as inductors and regulated capacitors. The switching power converter controls the conduction of the upper-bridge switch and the lower-bridge switch by the DC/DC controller, thereby adjusting the current flowing through the impedance circuit. Accordingly, the switching power converter can convert an input voltage into a corresponding output voltage.

In actual operation, in response to changes in conversion efficiency accompanying the load change, most of the existing switching power converters switch to different conduction modes according to the load, so as to improve the output efficiency. For example, in U.S. Pat. No. 6,433,525 issued to Intersil Company, whether a polarity of an inductor current is changed is used to determine the switch between a pulse-width modulation (PWM) mode and a pulse-frequency modulation (PFM) mode, and a counter is used to delay the switching timing of the two conduction modes.

In the above technology, the counter is needed to count the time at which the status of a load begins to change, that is, the counter is used to provide hysteretic switching mechanism. However, as a determination time of the counter must be spent on determining whether to switch the mode in the prior art, the overall response rate of the system is affected. In addition, the hysteretic switching provided by the counter increases the complexity of the hardware structure of the system.

SUMMARY OF THE INVENTION

Accordingly, the present invention is directed to a switching power converter, so as to provide a hysteretic mechanism in mode switching through switching of a threshold value, thereby improving system stability and output efficiency.

The present invention provides a switching power converter, which includes an upper-bridge switch, a lower-bridge switch, an impedance circuit, a first control circuit, a second control circuit, and a logic circuit. The upper-bridge switch is electrically serially connected to the lower-bridge switch. The impedance circuit generates an output voltage and a sensing current according to a conductive state of the upper-bridge switch and the lower-bridge switch. The first control circuit generates a first pulse signal according to the output voltage. The second control circuit has a first mode and a second mode for generating a second pulse signal and a third pulse signal individually.

In the first mode, the second control circuit compares the sensing current with a first threshold value, and switches to the second mode when a minimal value of the sensing current is greater than the first threshold value. In addition, in the second mode, the second control circuit compares the sensing current with a second threshold value, and switches to the first mode when the minimal value of the sensing current is lower than the second threshold value. The logic circuit controls the upper-bridge switch by the first pulse signal, and controls the lower-bridge switch by the second pulse signal or the third pulse signal.

In an embodiment of the present invention, the first control circuit further generates a control signal according to the output voltage, and the second control circuit includes a first mode unit, a second mode unit, a mode switching unit, and a switch. The first mode unit generates the second pulse signal according to the control signal and the sensing current. The second mode unit generates the third pulse signal inverted to the first pulse signal according to the control signal. The mode switching unit generates a first mode switching signal in the first mode, and generates a second mode switching signal in the second mode. The switch has a first, a second, and a third end, the first end of the switch receives the second pulse signal, the second end of the switch receives the third pulse signal, and the third end of the switch is electrically connected to the logic circuit. In addition, in operation, the switch conducts the third end to the first end thereof according to the first mode switching signal, and conducts the third end to the second end thereof according to the second mode switching signal.

In an embodiment of the present invention, the first threshold value is greater than the second threshold value.

In an embodiment of the present invention, the first mode is a discontinuous conduction mode, and the second mode is a continuous conduction mode.

Based on above, the second control circuit of the present invention can use different threshold values in different modes to determine whether to switch the mode thereof, and thus the switching power converter has a hysteretic effect in mode switching. Therefore, the stability and output efficiency of the switching power converter can be improved. In addition, compared with the prior art, as the switching power converter of the present invention does not need a counter, the overall response rate of a system can be further improved and the complexity of the hardware structure of the system can be lowered.

In order to make the above features and advantages of the present invention more comprehensive, embodiments are described in detail below with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
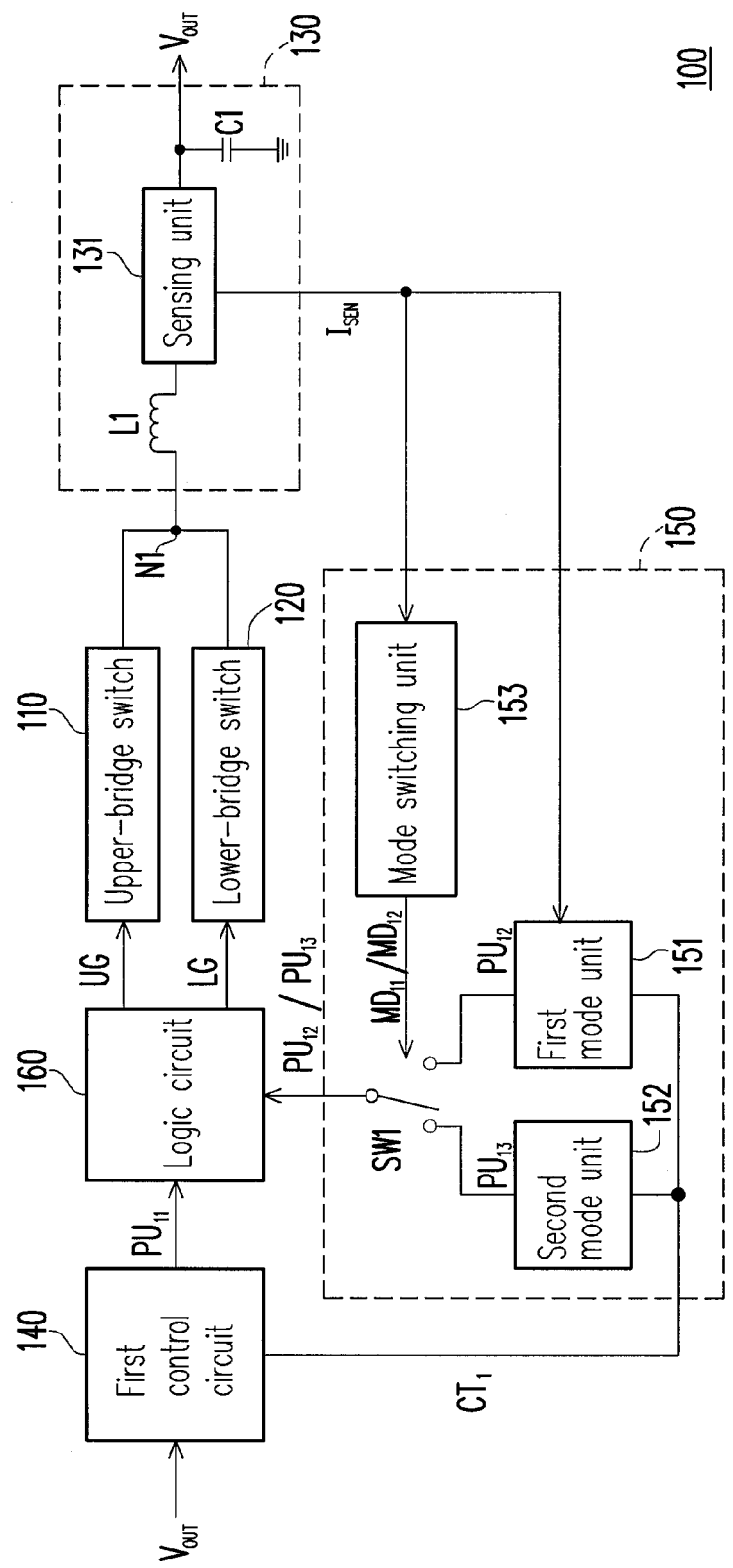
FIG. 1 is a block diagram of a switching power converter according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a switching power converter according to an embodiment of the present invention. Referring to FIG. 1, a switching power converter 100 includes an upper-bridge switch 110, a lower-bridge switch 120, an impedance circuit 130, a first control circuit 140, a second control circuit 150, and a logic circuit 160. The upper-bridge switch 110 is electrically connected to the lower-bridge switch 120 in series, and the impedance circuit 130 is electrically connected to a connection node N1 formed in serial connection of the upper-bridge switch 110 and the lower-bridge switch 120.

In this embodiment, description is made with the buck impedance circuit 130 as an example. Herein, the impedance circuit 130 includes an inductor L1, a sensing unit 131, and a capacitor C1. A first end of the inductor L1 is electrically connected to the connection node N1, and a second end of the inductor L1 is electrically connected to the sensing unit 131. In addition, a first end of the capacitor C1 is electrically connected to the sensing unit 131, and a second end of the capacitor C1 is electrically connected to a ground terminal.

In operation, the sensing unit 131 has a conduction path, which serves as a bridge for electrical connection between the capacitor C1 and the inductor L1. Moreover, with the switching of the conductive state of the upper-bridge switch 110 and the lower-bridge switch 120, a current flowing through the inductor L1 is correspondingly changed, and the capacitor C1 is correspondingly charged or discharged. Thereby, the impedance circuit 130 generates an output voltage $V_{OUT}$ through the first end of the capacitor C1. On the other hand, the sensing unit 131 senses the current flowing through the inductor L1, and accordingly generates a sensing current $I_{SEN}$. Though an implementation aspect of the impedance circuit 130 is given in this embodiment, the present invention is not limited thereto. The impedance circuit 130 may be changed by persons of ordinary skill in the art into a boost impedance circuit as desired in design.

With respect to the output voltage $V_{OUT}$ and the sensing current $I_{SEN}$ generated by the impedance circuit 130, the output voltage $V_{OUT}$ is fed back to the first control circuit 140, and the sensing current $I_{SEN}$ is fed back to the second control circuit 150. Herein, the first control circuit 140 generates a first pulse signal $PU_{11}$ according to the output voltage $V_{OUT}$. The second control circuit 150 has a first mode and a second mode, so as to generate a second pulse signal $PU_{12}$ and a third pulse signal $PU_{13}$ respectively.

In addition, the logic circuit 160 is electrically connected to the first control circuit 140 and the second control circuit 150. When switched to the first mode, the second control circuit 150 generates the second pulse signal $PU_{12}$. In this case, the logic circuit 160 controls the upper-bridge switch 110 by the first pulse signal $PU_{11}$, and controls the lower-bridge switch 120 by the second pulse signal $PU_{12}$. In contrast, when switched to the second mode, the second control circuit 150 generates the third pulse signal $PU_{13}$. In this case, the logic circuit 160 controls the upper-bridge switch 110 by the first pulse signal $PU_{11}$, and controls the lower-bridge switch 120 by the third pulse signal $PU_{13}$.

It should be noted that, the second control circuit 150 compares the sensing current $I_{SEN}$ with different standards under different modes, and uses a comparison result to determine whether to switch the mode thereof. For example, in the first mode, the second control circuit 150 compares the sensing current $I_{SEN}$ with a first threshold value $VT_{11}$, and switches to the second mode when a minimal value of the sensing current $I_{SEN}$ is greater than the first threshold value $VT_{11}$. Moreover, in the second mode, the second control circuit 150 compares the sensing current $I_{SEN}$ with a second threshold value $VT_{12}$, and switches to the first mode when the minimal value of the sensing current is lower than the second threshold value $VT_{12}$.

As the second control circuit 150 uses different threshold values in different modes to determine whether to switch the mode thereof, and thus a circuit has a hysteretic effect in mode switching. In other words, the switching power converter 100 provides a hysteretic mechanism in mode switching through the switching of the threshold values, thereby improving the system stability and output efficiency. In contrast, compared with the prior art, as the switching power converter 100 does not need a counter, the overall response rate of the system can be further improved, and the complexity of the hardware structure of the system can be lowered.

Figure 2:
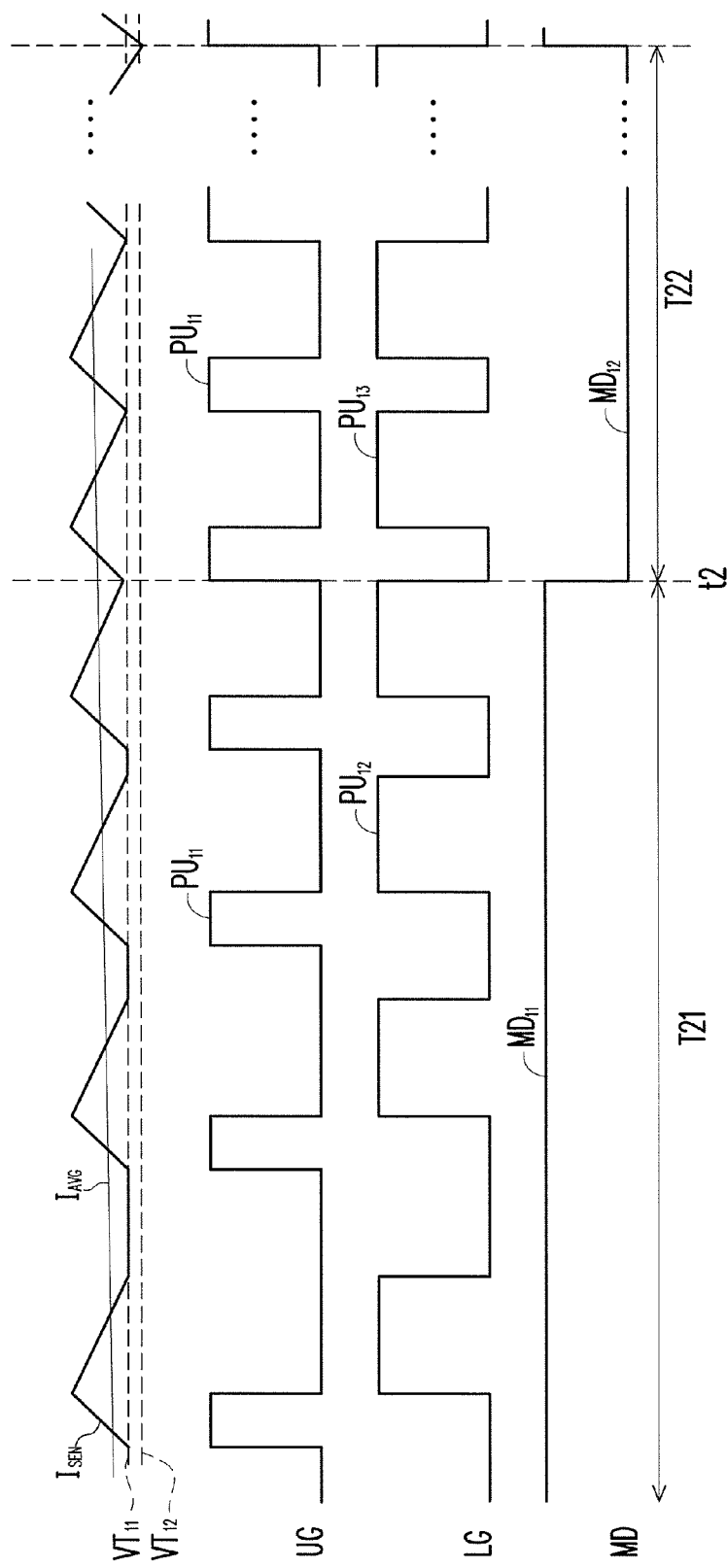
FIG. 2 is a timing diagram illustrating a switching power converter.

In order to make the present invention clear to persons of ordinary skill in the art, the operation of the switching power converter 100 is further described with a timing diagram as shown in FIG. 2 as an example, and a detailed structure of the second control circuit 150 is given. FIG. 2 is a timing diagram illustrating a switching power converter, and $VT_{11}$ and $VT_{12}$ are respectively the first threshold value and the second threshold value, $I_{SEN}$ is the sensing current, $I_{AVG}$ is an average value of the sensing current $I_{SEN}$, UG and LG are modulation signals outputted from the logic circuit 160, and MD is a mode switching signal outputted from the second control circuit 150.

In this embodiment, it is assumed that the first mode is a discontinuous conduction mode (DCM), and the second mode is a continuous conduction mode (CCM). Furthermore, as shown in FIG. 2, in Period T21, the second control circuit 150 operates in the first mode (for example, DCM), and compares the sensing current $I_{SEN}$ with the first threshold value $VT_{11}$. As the average value $I_{AVG}$ of the sensing current $I_{SEN}$ continuously rises, a minimal value of the sensing current $I_{SEN}$ is greater than the first threshold value $VT_{11}$ at a time point t2. Therefore, in Period T22, the second control circuit 150 switches to the second mode (for example, CCM), and compares the sensing current $I_{SEN}$ with the second threshold value $VT_{12}$. The second threshold value $VT_{12}$ is less than the first threshold value $VT_{11}$, and the second threshold value $VT_{12}$ may be, for example, 0.

Further, the second control circuit 150 includes a first mode unit 151, a second mode unit 152, a mode switching unit 153, and a switch SW1. The switch SW1 has a first end, a second end, and a third end. In addition, the first end of the switch SW1 is electrically connected to the first mode unit 151, the second end of the switch SW1 is electrically connected to the second mode unit 152, and the third end of the switch SW1 is electrically connected to the logic circuit 160.

In operation, the first mode unit 151 generates the second pulse signal $PU_{12}$ according to a control signal $CT_1$ and the sensing current $I_{SEN}$. Moreover, the second mode unit 152 generates the third pulse signal $PU_{13}$ according to the control signal $CT_1$. The control signal $CT_1$ is generated by the first control circuit 140 according to the output voltage $V_{OUT}$. In addition, In Period T21, the mode switching unit 153 generates the first mode switching signal $MD_{11}$, such that the switch SW1 conducts its third end to the first end. Thereby, the second pulse signal $PU_{12}$ generated by the first mode unit 151 is transferred to the logic circuit 150.

As such, in Period T21, that is, in the first mode (for example, DCM), the logic circuit 160 uses the first pulse signal $PU_{11}$ to form the modulation signal UG for controlling the upper-bridge switch 110, and uses the second pulse signal $PU_{12}$ to form the modulation signal LG for controlling the lower-bridge switch 120. It should be noted that, as shown in FIG. 2, in the first mode (for example, DCM), the frequency of the first pulse signal $PU_{11}$ varies with the sensing current $I_{SEN}$, that is, the frequency of the first pulse signal $PU_{11}$ varies with the current flowing through the inductor L1. Moreover, the high transition point of the second pulse signal $PU_{12}$ depends on the first pulse signal $PU_{11}$, and the low transition point of the second pulse signal $PU_1$ depends on the sensing current $I_{SEN}$.

On the other hand, in Period T22, the mode switching unit 153 generates the second mode switching signal $MD_{12}$, such that the switch SW1 conducts its third end to the second end. Thereby, the third pulse signal $PU_{13}$ generated by the second mode unit 152 is transferred to the logic circuit 150. As such, in Period T22, that is, in the second mode (for example CCM), the logic circuit 160 uses the first pulse signal $PU_{11}$ to form the modulation signal UG for controlling the upper-bridge switch 110, and uses the third pulse signal $PU_{13}$ to form the modulation signal LG for controlling the lower-bridge switch 120. It should be noted that, as shown in FIG. 2, in the second mode (for example, CCM), the frequency of the first pulse signal $PU_{11}$ does not vary with the sensing current $I_{SEN}$, that is, the frequency of the first pulse signal $PU_{11}$ does not vary with the current flowing through the inductor L1. Moreover, the third pulse signal $PU_{13}$ and the first pulse signal $PU_{11}$ are inverted to each other.

To sum up, the second control circuit of the present invention uses different threshold values in different modes to determine whether to switch the mode thereof, and thus the circuit has a hysteretic mechanism in mode switching. Thereby, the switching power converter of the present invention can improve the system stability and output efficiency through the hysteretic mechanism in mode switching. Moreover, the switching power converter of the present invention can further lower the complexity of the hardware structure of the system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switching power converter, comprising:
    an upper-bridge switch and a lower-bridge switch, electrically connected to each other in series;
    an impedance circuit, generating an output voltage and a sensing current according to a conductive state of the upper-bridge switch and the lower-bridge switch;
    a first control circuit, generating a first pulse signal according to the output voltage;
    a second control circuit, having a first mode and a second mode, for generating a second pulse signal and a third pulse signal individually, wherein in the first mode, the second control circuit compares the sensing current with a first threshold value, and switches to the second mode when a minimal value of the sensing current is greater than the first threshold value, and in the second mode, the second control circuit compares the sensing current with a second threshold value, and switches to the first mode when the minimal value of the sensing current is lower than the second threshold value; and
    a logic circuit, controlling the upper-bridge switch by the first pulse signal, and controlling the lower-bridge switch by the second pulse signal or the third pulse signal, wherein the first pulse signal and the third pulse signal are inverted to each other, a high transition point of the second pulse signal depends on the first pulse signal, and a low transition point of the second pulse signal depends on the sensing current.

2. The switching power converter according to claim 1, wherein the first control circuit further generates a control signal according to the output voltage, and the second control circuit comprises:
    a first mode unit, generating the second pulse signal according to the control signal and the sensing current;
    a second mode unit, generating the third pulse signal inverted to the first pulse signal according to the control signal;
    a mode switching unit, generating a first mode switching signal in the first mode, and generating a second mode switching signal in the second mode; and
    a switch, having a first end receiving the second pulse signal, a second end receiving the third pulse signal, and a third end electrically connected to the logic circuit, wherein the switch conducts the third end to the first end thereof according to the first mode switching signal, and conducts the third end to the second end thereof according to the second mode switching signal.

3. The switching power converter according to claim 1, wherein the impedance circuit comprises:
    an inductor, having a first end electrically connected to a connection node formed in serial connection of the upper-bridge switch and the lower-bridge switch;
    a sensing unit, electrically connected to a second end of the inductor, and sensing a current flowing through the inductor so as to output the sensing current; and
    a capacitor, having a first end electrically connected to the sensing unit and a second end electrically connected to a ground terminal, wherein the impedance circuit generates the output voltage through the first end of the capacitor.

4. The switching power converter according to claim 1, wherein the first threshold value is greater than the second threshold value.

5. The switching power converter according to claim 1, wherein the second threshold value is 0.

6. The switching power converter according to claim 1, wherein the first mode is a discontinuous conduction mode, and the second mode is a continuous conduction mode.

7. The switching power converter according to claim 1, wherein in the first mode, the frequency of the first pulse signal generated by the first control circuit varies with the sensing current, and in the second mode, the frequency of the first pulse signal generated by the first control circuit is fixed.

8. A switching power converter, comprising:
    an upper-bridge switch and a lower-bridge switch, electrically connected to each other in series;
    an impedance circuit, generating an output voltage and a sensing current according to a conductive state of the upper-bridge switch and the lower-bridge switch;
    a first control circuit, generating a first pulse signal according to the output voltage;
    a second control circuit, having a first mode and a second mode, for generating a second pulse signal and a third pulse signal individually, wherein in the first mode, the second control circuit compares the sensing current with a first threshold value, and switches to the second mode when a minimal value of the sensing current is greater than the first threshold value, and in the second mode, the second control circuit compares the sensing current with a second threshold value, and switches to the first mode when the minimal value of the sensing current is lower than the second threshold value; and a logic circuit, controlling the upper-bridge switch by the first pulse signal, and controlling the lower-bridge switch by the second pulse signal or the third pulse signal, wherein a high transition point of the second pulse signal depends on the first pulse signal.

9. A switching power converter, comprising:

an upper-bridge switch and a lower-bridge switch, electrically connected to each other in series;

an impedance circuit, generating an output voltage and a sensing current according to a conductive state of the upper-bridge switch and the lower-bridge switch;

a first control circuit, generating a first pulse signal according to the output voltage;

a second control circuit, having a first mode and a second mode, for generating a second pulse signal and a third pulse signal individually, wherein in the first mode, the second control circuit compares the sensing current with a first threshold value, and switches to the second mode when a minimal value of the sensing current is greater than the first threshold value, and in the second mode, the second control circuit compares the sensing current with a second threshold value, and switches to the first mode when the minimal value of the sensing current is lower than the second threshold value; and a logic circuit, using the first pulse signal to form a first modulation signal for controlling the upper-bridge switch in the first mode and the second mode, using the second pulse signal to form a second modulation signal for controlling the lower-bridge switch in the first mode, and using the third pulse signal to form the second modulation signal in the second mode.

* * * * *